United States Patent
Hori

(10) Patent No.: US 6,450,593 B2
(45) Date of Patent: Sep. 17, 2002

(54) ELASTIC CRAWLER SHOE FOR DISCHARGING SNOW

(75) Inventor: Kazutoshi Hori, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/753,621

(22) Filed: Jan. 4, 2001

(30) Foreign Application Priority Data

Jan. 26, 2000 (JP) ........................................ 2000 016635

(51) Int. Cl.⁷ .............................................. B62D 55/24
(52) U.S. Cl. ........................ 305/173; 305/101; 305/177
(58) Field of Search ................................ 305/100, 101, 305/111, 171, 173, 174, 175, 176, 177, 193, 194, 195, 197

(56) References Cited

U.S. PATENT DOCUMENTS

| | | | |
|---|---|---|---|
| RE29,718 E | * | 8/1978 | Reinsma et al. |
| RE29,723 E | * | 8/1978 | Haslett et al. |
| 4,150,857 A | * | 4/1979 | Dester et al. |
| 5,362,142 A | * | 11/1994 | Katoh |
| 5,368,376 A | * | 11/1994 | Edwards et al. |
| 5,447,365 A | * | 9/1995 | Muramatsu et al. |
| 5,997,110 A | * | 12/1999 | Katoh et al. |

FOREIGN PATENT DOCUMENTS

| | | |
|---|---|---|
| JP | 4-118888 | 10/1992 |
| JP | 8-48269 | 2/1996 |
| WO | WO99/12799 | 3/1999 |

* cited by examiner

*Primary Examiner*—Russell D. Stormer
(74) *Attorney, Agent, or Firm*—Armstrong, Westerman, & Hattori, LLP.

(57) ABSTRACT

With the objective of providing an elastic crawler shoe which is capable of discharging snow which gets into a space between crawler belt links before a packing phenomenon occurs, a projection which is made of an elastic material is provided so as to protrude into the space which is enclosed by the right and left crawler belt links and front and rear connecting pins.

3 Claims, 6 Drawing Sheets

(a)

(b)

(c)

(a)

(b)

ELASTIC CRAWLER SHOE FOR DISCHARGING SNOW

TECHNICAL FIELD

The present invention relates to an elastic crawler shoe which is suitable for use in a tracklaying vehicle such as a construction machine, an agricultural machine or the like.

BACKGROUND ART

In a conventional tracklaying vehicle such as a bulldozer, a crawler belt which is made of iron is wound around a plurality of rolling wheels arranged on the upper and lower parts of a track frame and is driven by driven drive sprockets so as to make the vehicle travel. However, the vehicle equipped with such an iron crawler belt damages the surface of a paved public road during traveling. For this reason, recently, what is called a rubber crawler belt system in which many core bars which are made of metal are embedded in an endless rubber belt at regular intervals and are engaged with the drive sprockets, thereby to drive the belt is often adopted.

However, in the case of this rubber crawler belt, since many core bars are embedded in the endless rubber belt, when the rubber belt is damaged resulting from cracks, exfoliation and the others, the rubber crawler belt as a whole needs to be replaced with a new one, and therefore there were problems that running costs on a user side run up and time-consuming maintenance is required.

To overcome the foregoing problems, a crawler belt formed in such a manner that many elastic crawler shoes, each of which is comprised of one core bar and an elastic body bonded to the core bar so as to cover the core bar, are arranged in a longitudinal direction of a crawler is disclosed, for instance, in Japanese Patent Laid-Open Publication No. 8-48269 (1996), International Publication No. WO99/12799 and the others. In the case of this proposed elastic crawler shoe, even when the elastic body of one of the elastic crawler shoes is damaged, only the damaged shoe can be replaced, and therefore this elastic crawler shoe is advantageous in that running costs and time required for maintenance can be cut down.

However, when the above-mentioned conventional elastic crawler shoe is used, for instance, on a pressed snow road in winter, snow covering the road surface gets into a space between right and left crawler belt links, and a phenomenon (which is called "a packing phenomenon") in which the sprocket or the like repeatedly packs down the snow which has gotten into the space problematically occurs. When such a packing phenomenon occurs, the sprocket or an idler cannot engage with the crawler belt links, and the crawler belt comes off as a result.

The present invention addresses the problem discussed above, and aims to provide an elastic crawler shoe which is capable of discharging snow which gets into a space between crawler belt links before a packing phenomenon occurs, thereby circumventing a situation in which a crawler belt comes off.

SUMMARY OF THE INVENTION

The above object can be accomplished by an elastic crawler shoe according to the present invention, the elastic crawler shoe comprising a core bar fixed to crawler belt links, each of which is endlessly coupled by means of connecting pins, and an elastic body bonded to the core bar so as to cover the core bar, the elastic crawler shoe further comprising a projection which is made of an elastic material, the projection being provided so as to protrude into a space which is enclosed by the right and left crawler belt links and the front and rear connecting pins.

According to the present invention, even when snow covering the road surface gets into the space which is enclosed by the right and left crawler belt links and the front and rear connecting pins and is packed down by a sprocket or the like, the projection which is compressed by the packed snow stretches to its original length owing to its own resilience in an area where the crawler belt links become disengaged from the sprocket or the like, thereby discharging the packed snow from within the above-mentioned space. In this way, the snow which has gotten into the space between the crawler belt links is discharged before a packing phenomenon occurs, and a crawler belt can thus be prevented from coming off.

In the present invention, a structure in which a covering member which is made of either iron or resin is bonded to the surface of the projection can be adopted. Thus, even when pebbles and the others get caught between the crawler belt links, the covering member which covers the surface of the projection can prevent the projection from becoming deformed and can prevent the surface of the projection from becoming chipped.

Instead of being covered with the covering member which is made of either iron or resin, the surface of the projection may be formed out of an elastic material whose hardness is higher than that of the main body of the projection.

Moreover, in the present invention, it is preferable that the core bar has a hole, so that the elastic body is unitarily formed with the projection. The elastic crawler shoe the elastic body of which is unitarily formed with the projection therefore has the advantage of being easily molded.

Furthermore, the projection may be detachably mounted on the core bar. Thus, when the projection is damaged, only the projection can be replaced, and this replacement can be carried out with ease. In this case, it is preferable that a core bar for the projection is embedded in the projection and is bolted to the core bar. Thus, the projection can be detached with ease.

DESCRIPTION OF THE PREFERRED EMBODIMENTS

Preferred embodiments of the present invention are concretely demonstrated hereinafter with reference to the accompanying drawings.

Figure 1A:
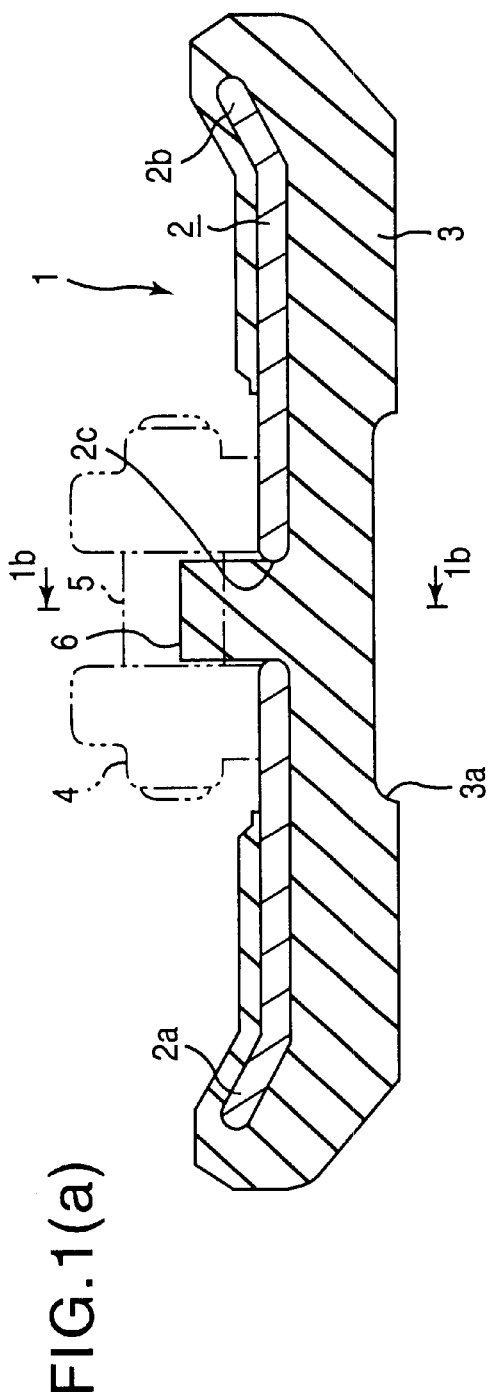
FIG. 1(a) is a sectional view of an elastic crawler shoe in accordance with one embodiment of the present invention.
Figure 1B:
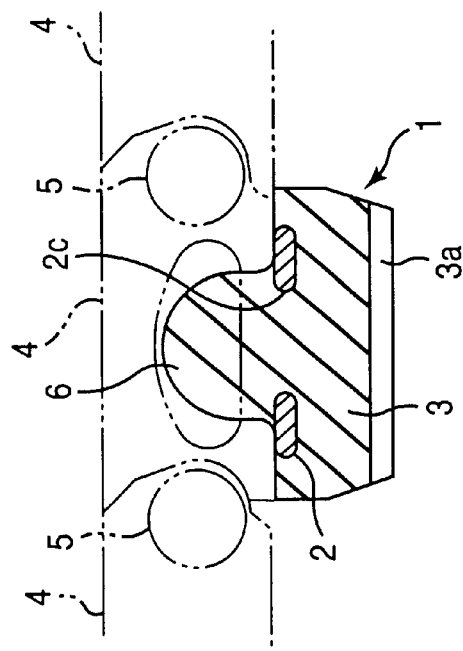
FIG. 1(b) is a sectional view taken along line A—A of FIG. 1(a).
Figure 2:
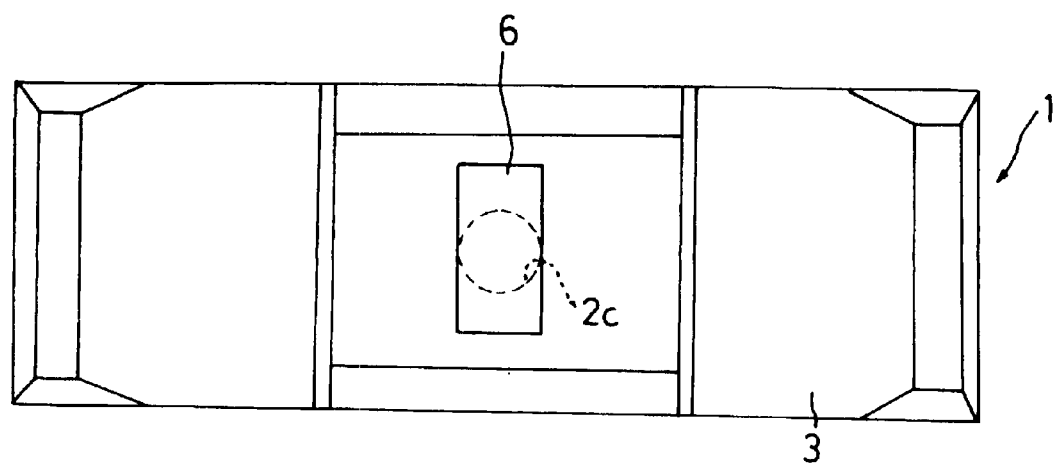
FIG. 2 is a plan view of the elastic crawler shoe in accordance with the embodiment.

FIG. 1(a) is a sectional view of an elastic crawler shoe in accordance with one embodiment of the present invention, and FIG. 1(b) is a sectional view taken along line A—A of FIG. 1(a). FIG. 2 is a plan view of the elastic crawler shoe in accordance with the embodiment.

Figure 3:
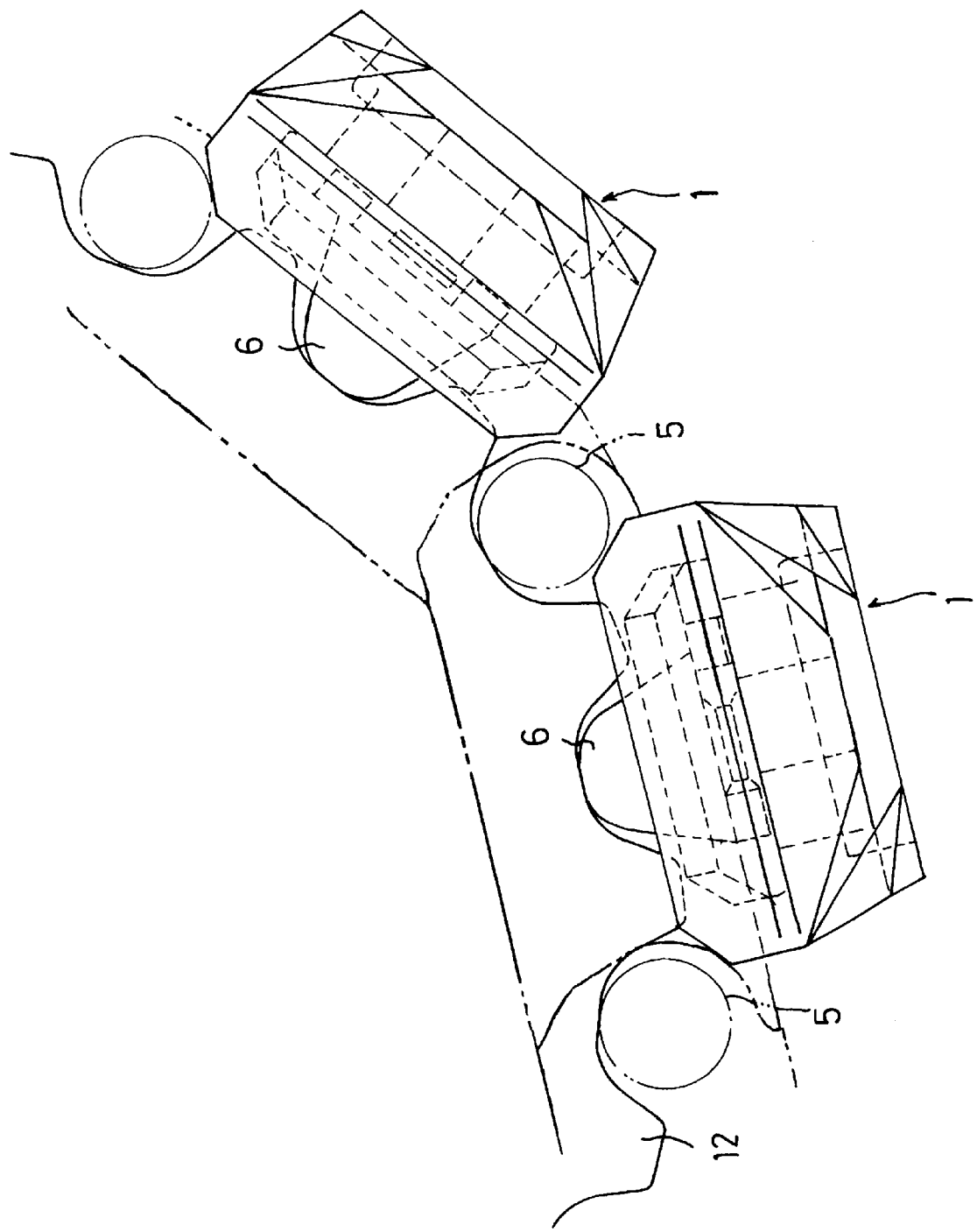
FIG. 3 illustrates a projection being at an engaging part of a sprocket.

An elastic crawler shoe 1 in accordance with the present embodiment has a structure in which an elastic body 3 which is made of rubber or the like is bonded to a core bar 2 so as to cover the core bar 2. The elastic crawler shoe 1 is directly fixed to crawler belt links 4 by means of bolts which are respectively inserted in bolt insertion holes defined in the elastic body 3. A crawler belt as a whole is constructed in such a manner that a plurality of elastic crawler shoes 1 are arranged in parallel relation in a traveling direction of a crawler, and each end of each of the crawler belt links 4 is rotatably coupled to each end of each of the next crawler belt links 4 by means of a connecting pin 5. The crawler belt is rotatively driven by the crawler belt links 4 which are driven by engaging with a sprocket 12 (see FIG. 3) and the like, so that a vehicle travels.

The core bar 2 is made of a material of high rigidity so that it will not become deformed even when vehicle body weight is imposed thereon. The examples of such a material include common core bar materials such as steel, cast steel, cast iron and the like and materials such as metallic composite materials, non-metallic composite materials and the others. End portions 2a, 2b of the core bar 2 are each bent at a required angle toward a non-ground contact face of the elastic crawler shoe 1, and the core bar 2 has a through hole 2c at its central portion in a longitudinal direction thereof. The through hole 2c may be either circular or elliptical. It is preferable that as shown in FIG. 1(a), the inner edge of the hole is rounded off or chamfered.

The elastic body 3 is made of a relatively soft material such as rubber, urethane, resin, an elastomer, a non-metallic composite material or the like. It should be noted that in cases where the elastic body 3 is made of rubber, vulcanization-bonding, which is a common method, or the like is used to embed the core bar 2 in the elastic body 3. The elastic body 3 has a concavity 3a at its central portion in the longitudinal direction of the crawler shoe 1 on the ground contact face side, and its end portions on the non-ground contact face side are each bent at a required angle toward the non-ground contact face so as to fit the bent shape of the core bar 2.

Moreover, the elastic body 3 has a projection 6 at its central portion on the non-ground contact face side. The projection 6 is provided so as to protrude toward the crawler belt links 4 through the through hole 2c which is defined in the core bar 2. The head of the projection 6 is substantially semi-circular in vertical section which is parallel to the crawler belt links 4, while the apex thereof is positioned beyond ½ of the height of the crawler belt links 4.

In the present embodiment, it is preferable that rubber whose hardness falls in the range of 50 to 80 at 0° C. in terms of JIS A $H_s$ is used as a material of the projection 6, that is to say, the elastic body 3 so that the projection 6 can perform its function (will be described later).

In an area where the crawler belt links 4 do not engage with the sprocket or an idler, as shown in FIG. 1(b), the projection 6 of the elastic body 3 of the thus-configured elastic crawler shoe 1 in accordance with present embodiment protrudes into a space which is enclosed by the right and left crawler belt links 4, 4 and the front and rear connecting pins 5, 5. With the projection 6 being in this state, when snow covering the road surface gets into the above-mentioned space as the vehicle travels on a pressed snow road, the crawler belt links 4, 4 engage with the sprocket 12 (see FIG. 3) or the like with the snow being in the above-mentioned space. The sprocket 12 or the like packs down the snow within the above-mentioned space during engagement, and the projection 6 is thus compressed by the packed snow. When the crawler belt links 4, 4 reach an area where they become disengaged from the sprocket 12 or the like, the projection 6 is freed from pressing force of the sprocket 12 or the like and stretches to its original length owing to its own resilience, and the packed snow is thus discharged from within the above-mentioned space. In this way, the snow which gets into the space between the crawler belt links 4, 4 is discharged before a packing phenomenon occurs, and the crawler belt is prevented from coming off as a result.

Figure 4:
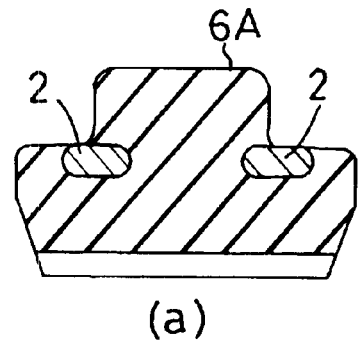
FIGS. 4(a) to 4(c) are sectional views which respectively illustrate the respective shapes of projections in accordance with other embodiments.
Figure 4:
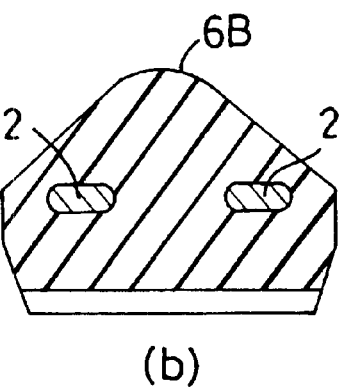
Figure 4:
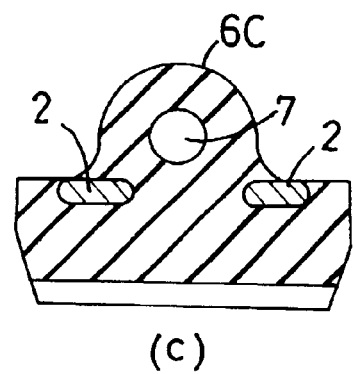

In the present embodiment, the projection 6 which is substantially semi-circular in section has been explained; however, other various modified shapes are also available. FIGS. 4(a) to 4(c) are sectional views which illustrate those projections modified in shape, respectively.

A projection 6A of FIG. 4(a) is substantially rectangular in section, while a projection 6B of FIG. 4(b) is shaped into a gentle chevron. In FIG. 4(c), a cavity 7 which is circular in section is formed in the center of a substantially semi-circular projection 6C. When the cavity 7 is formed in the projection 6C, the projection 6C becomes low in rigidity and easily bends when it experiences pressing force.

Figure 5:
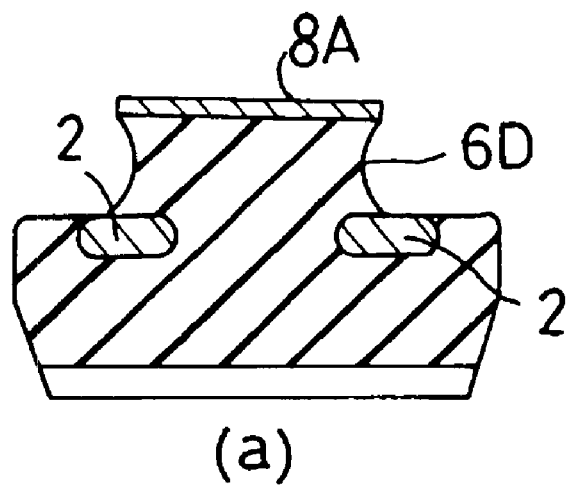
FIGS. 5(a) and 5(b) are sectional views which respectively illustrate projections, the surfaces of which are respectively covered with covering members, in accordance with other embodiments.
Figure 5:
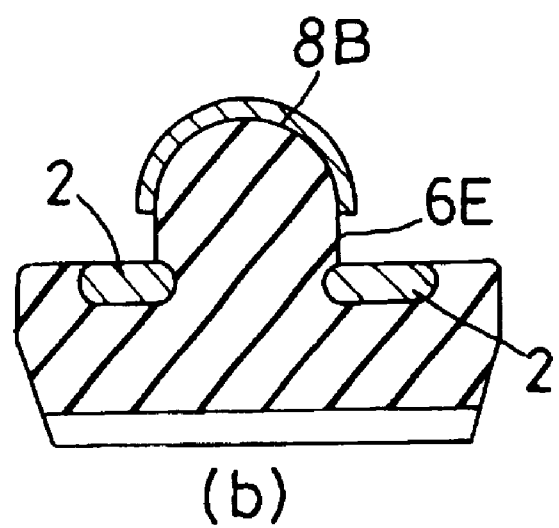

Moreover, as shown in FIGS. 5(a) and 5(b), structures in which covering members 8A, 8B each of which is made of either iron or resin are bonded to the respective surfaces of projections 6D, 6E, respectively, can also be adopted. According to these structures, even when pebbles and the others get caught between the crawler belt links, since the respective surfaces of the projections 6D, 6E are covered with the covering members 8A, 8B, respectively, the projections 6D, 6E can be prevented from becoming deformed, while their respective surfaces can be prevented from becoming chipped.

Instead of being covered with either the covering member 8A which is made of either iron or resin or the covering member 8B which is made of either iron or resin, the surface of the projection can be formed into a hard rubber layer the material of which is different from the rubber which constitutes the main body of the projection, so that the two layers constitute the projection.

Figure 6:
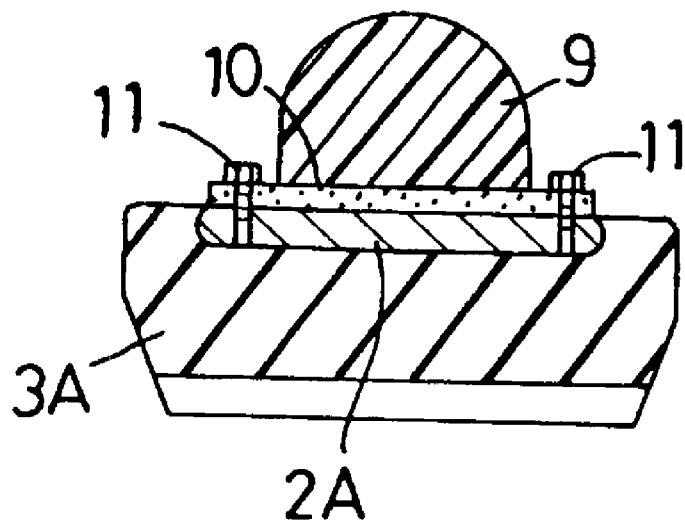
FIG. 6 is a sectional view illustrating a detachable projection in accordance with the other embodiment.

In each of the foregoing embodiments, the projection which is unitarily formed with the elastic body has been explained. However, as shown in FIG. 6, a projection 9 can be detached from an elastic body 3A. In the embodiment shown in this drawing, one side of a projection core bar 10 is secured to the projection 9, while the other side thereof is fixed to a core bar 2A of the elastic body 3A by means of a plurality of bolts 11. Thus, when the projection 9 is damaged, the projection core bar 10 to which the projection 9 is secured can be unbolted, so that the projection 9 can be replaced with a new one with ease. It should be noted that similarly to those of FIGS. 5(a) and 5(b), even the surface of the projection 9 which is made separately from the elastic body 3A can be covered with a covering member.

What is claimed is:

1. An elastic crawler shoe comprising a core bar for fixing to left and right crawler belt links, each of which belt links is endlessly coupled by means of front and rear connecting pins, and an elastic body bonded to the core bar so as to cover the core bar, said core bar having a hole formed therein, the elastic crawler shoe further comprising a projection which is made of an elastic material, the projection being unitarily formed with said elastic body so as to protrude through said hole and into a space which is enclosed by the right and left crawler belt links and the front and rear connecting pins.

2. The elastic crawler shoe as defined in claim 1, wherein a covering member which is made of either iron or resin is bonded to the surface of the projection.

3. The elastic crawler shoe as defined in claim 1, wherein the surface of the projection is formed out of an elastic material whose hardness is higher than that of the main body of the projection.

* * * * *